United States Patent

Mori et al.

[11] 3,826,939
[45] July 30, 1974

[54] MINIATURE ELECTRIC SYNCHRONOUS MOTOR

[75] Inventors: Toyoshi Mori, Gifu; Yoshitaka Iwase, Nagoya, both of Japan

[73] Assignee: Kabushiki Kaisha Tokai Rika Denki Seisakusho, Nishibiwajima-cho, Nishikasugai-gun, Aichi Pref., Japan

[22] Filed: July 10, 1973

[21] Appl. No.: 377,996

[30] Foreign Application Priority Data
July 13, 1972  Japan.............................. 47-69539
May 8, 1973  Japan.............................. 48-50251

[52] U.S. Cl................................ 310/154, 310/254
[51] Int. Cl............................................. H02k 21/26
[58] Field of Search............................ 310/154, 254

[56] References Cited
UNITED STATES PATENTS
3,348,083  10/1967  Inariba............................ 310/154 X
3,423,617  1/1969  Kohlhagen...................... 310/154 X
3,555,325  1/1971  Inariba............................ 310/154 X Primary Examiner—George Harris
Attorney, Agent, or Firm—Woodhams, Blanchard & Flynn

[57] ABSTRACT

A miniature electric synchronous motor with a rotor formed of pole teeth, characterized by one or more projections formed on a yoke at positions deviated from the center lines of poles of a stator to effectively utilize magnetic flux between said projections and pole teeth for rotation of said pole teeth, thereby to enable the rotor to start wherever the pole teeth rest.

8 Claims, 15 Drawing Figures

PATENTED JUL 30 1974 3,826,939

MINIATURE ELECTRIC SYNCHRONOUS MOTOR

This invention relates to a single-phase induction type miniature electric synchronous motor having a pole teeth acting as a rotor, and more particularly to improvement in a synchronous motor of the kind which by far enhances starting efficiency thereof.

Such a motor having a rotor formed of pole teeth is known from, for example, U.S. Pat. No. 3,348,083 in which the motor is structured as depicted in FIGS. 1 through 3. Stated illustratively, a permanent magnet 1 is magnetized to have alternating north and south poles on the periphery thereof, disposed concentrically with a bearing 2 and a rotary shaft 3 which are made of non-magnetic material, and fixed to an auxiliary yoke 4, acting as a stator of the motor. Said auxiliary yoke 4 is made of soft magnetic material and provided with an annular projection 7 facing the tip ends of pole teeth 6 extending in the axial direction of the motor so as to give and receive magnetic flux effectively. Said pole teeth 6, forming part of a rotor 6', is made of soft magnetic material, fixed to the rotary shaft 3 through a boss 5 of non-magnetic material, and formed to extend in the axial direction of the rotary shaft, concentrically with the stator, permanent magnet 1, and radially keeping a certain distance from the periphery of the magnet 1. The number of said poles of the permanent magnet stator 1 is an even multiple of the number of said pole teeth 6. An annular exciting coil 8 is arranged concentrically with the rotary shaft 3. To said rotary shaft 3 is connected an output pinion or gear 10. The magnetic circuit of the magnetic flux generated by said annular exciting coil 8 is formed by a main yoke 9 of soft magnetic material in cooperation with said pole teeth 6 and said auxiliary yoke 4.

In the thus constructed single-phase induction type synchronous motor, when the driving of the motor is halted upon deenergization of the exciting coil 8 after driving the motor for a certain period of time, the pole teeth thereof will stop on the boundaries between the north and south poles of the permanent magnet 1, respectively, due to the torque acting between the poles of the permanent magnet 1 and the pole teeth 6 if there exists no load such as journal friction.

In fact, however, such a load of journal friction inevitably exists, so that the pole teeth 6 possibly stops in the vicinity of the center lines of the poles of the permanent magnet 1 on balance between the friction torque caused by said journal friction and the torque caused between the pole teeth 6 of the rotor and the poles of the permanent magnet 1.

When the exciting coil 8 is again energized in the state the pole teeth 6 are rested in the vicinity of the center lines of the poles of the permanent magnet 1, the torque acting between said poles of the permanent magnet 1 and the pole teeth 6 which are now energized and magnetized is too small, at such a position as vicinity of the center line of said poles, to overcome the load of friction torque, thus preventing the pole teeth from getting away from said position and making the starting of the motor impossible.

It is therefore required to reduce the load such as friction torque and many efforts have been made to mechanically and structurally reduce such a friction. However, both of the rotary shaft 3 and the bearing 2 cannot be made small in view of durability and anti-shock feature. Thus, this problem has not been actually solved hitherto.

This invention was made to overcome the above-mentioned problem and it is therefore an object of the present invention to provide a single-phase induction type miniature electric synchronous motor which is capable of causing torque on the pole teeth of the rotor rested in the vicinity of the center line of the poles of the permanent magnet 1 to get the pole teeth away from the rested positions, overcoming the friction torque, by utilizing the force acting between the pole teeth and the yoke, thereby to improve self-starting efficiency.

Other objects of this invention will be obvious from the contents of the specification hereinafter disclosed.

Essentially according to the present invention, there is provided a miniature electric synchronous motor comprising a permanent magnet stator magnetized radially to provide north and south poles alternating therearound at equal angular spacings; a rotary shaft disposed coaxially with said permanent magnet stator; a rotor fixed to said rotary shaft and having pole teeth of soft magnetic material extending in the axial direction of said rotary shaft and in the concentric relation with said permanent magnet stator through a gap therebetween, the number of said poles of the permanent magnet stator being an even multiple of the number of said pole teeth; an annular exciting coil concentric with said permanent magnet stator and said rotor and radially spaced from said rotor through a gap; an auxiliary yoke provided with one or more projections each adapted to face the pole teeth at a position deviated from the center line of the respective pole of the permanent magnet; and a main yoke which forms a magnetic circuit interlinking with said annular exciting coil in cooperation with said pole teeth and said auxiliary yoke.

The invention will be better understood from the following description taken in connection with the accompanying drawings in which.

In the drawings and the following descriptions, like portions or parts are denoted by like numerals or characters.

Figure 1:
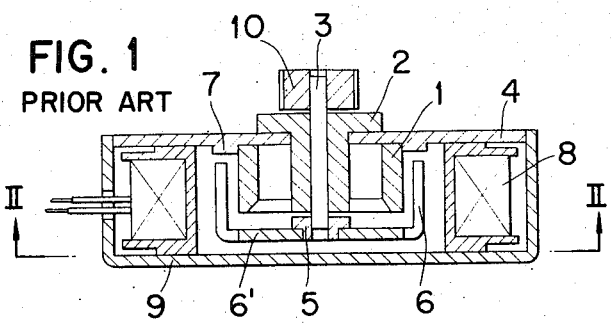
FIG. 1 is a longitudinal cross sectional view of a conventional synchronous motor.
Figure 2:
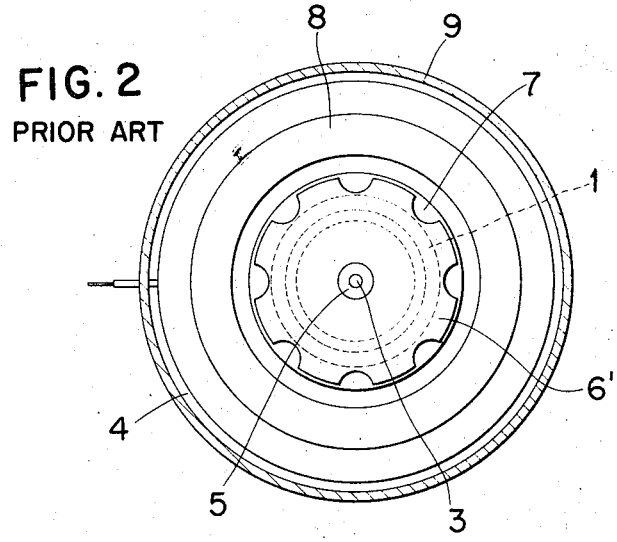
FIG. 2 is a cross sectional view taken along line II — II of FIG. 1.
Figure 3:
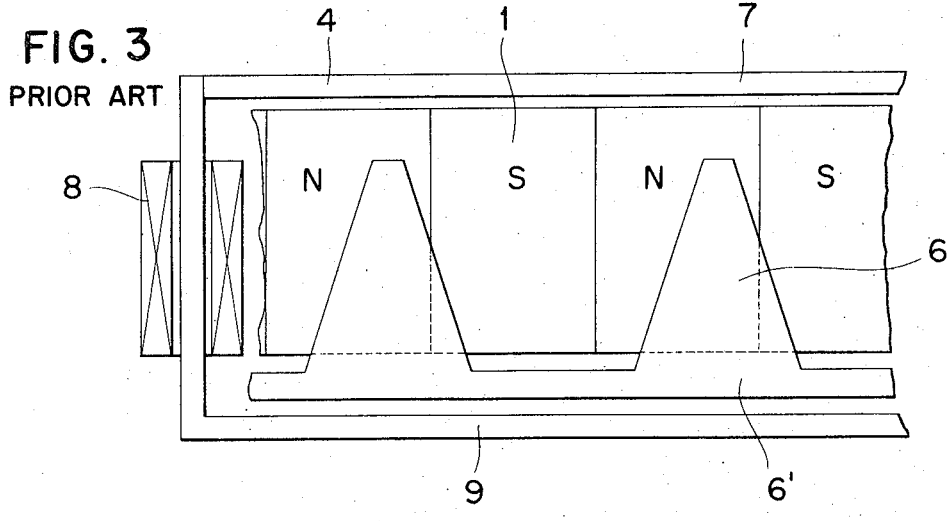
FIG. 3 is a development view of FIG. 1.

In one aspect of the present invention, there is provided a miniature electric synchronous motor comprising a permanent magnet stator magnetized radially to provide north and south poles alternating therearound at equal angular spacings; a rotary shaft disposed coaxially with said permanent magnet stator; a rotor fixed to said rotary shaft and having pole teeth of soft magnetic material extending in the axial direction of said rotary shaft and in the concentric relation with said permanent magnet stator through a gap therebetween; the number of said poles of the permanent magnet stator being an even multiple of the number of said pole teeth; an annular exciting coil concentric with said permanent magnet stator and said rotor and radially spaced from said rotor through a gap; an auxiliary yoke provided with projections of at least $$\frac{1}{2} \times \frac{\text{number of poles of permanent magnet}}{\text{number of pole teeth}},$$

at positions corresponding to the boundary lines between the adjacent two poles of the permanent magnet at angular spacings of $2n \times$ pole-pitch wherein $n$ is an integer; and a main yoke which forms a magnetic circuit interlinking with said annular exciting coil in cooperation with said pole teeth and said auxiliary yoke.

Illustrative explanation of the above-mentioned aspect will be made with reference to FIGS. 4 to 7, wherein the number of the projections on the auxiliary yoke is one-half of the number of the poles of the permanent magnet and said projections are disposed at angular spacings equal to $2 \times$ pole-pitch.

In FIGS. 4 through 7, a stator of a permanent magnet 1, a bearing 2, a rotary shaft 3, a boss 5, pole teeth 6, a rotor 6', an annular exciting coil 8, a main yoke 9 and an output gear 10 are constructed and disposed identically with those of the above-mentioned prior synchronous motor.

Figure 4:
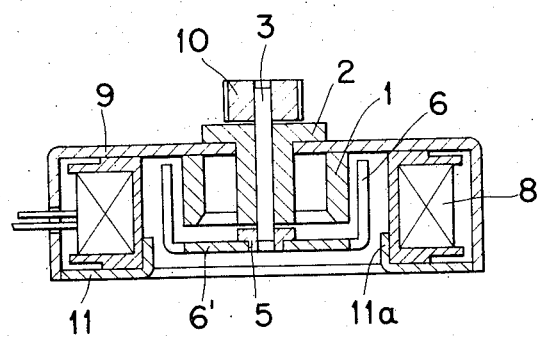
FIG. 4 is a longitudinal cross sectional view of one form of the synchronous motor embodying the present invention.
Figure 5:
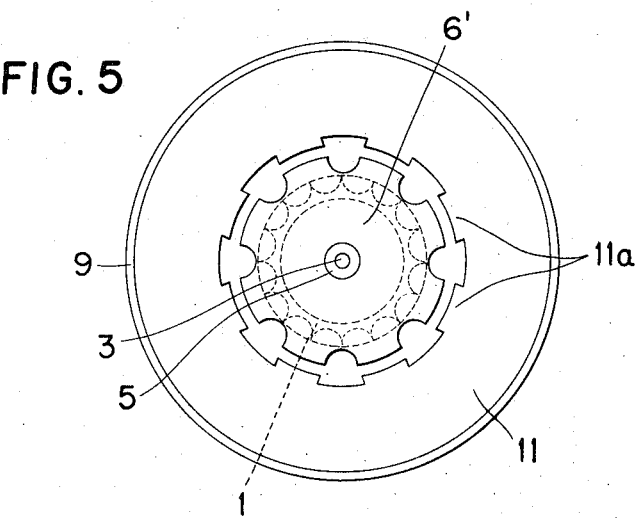
FIG. 5 is rear side elevational view of FIG. 4.

In FIGS. 4 and 5, an auxiliary yoke 11 made of soft magnetic material has a plurality of projections $11_a$ arranged concentrically with the permanent magnet 1 so as to face the diametrical peripheries of the end portions of the pole teeth 6 extending in the axial direction of the rotary shaft 3 at positions corresponding to the respective boundaries between the poles of said permanent magnet 1 at equal angular intervals, namely, angular distances each corresponding to two pitches of the poles of the permanent magnet 1.

As mentioned above, the number of said projections $11_a$ is one-half of the number of poles of the permanent magnet 1 in this embodiment.

Figure 6:
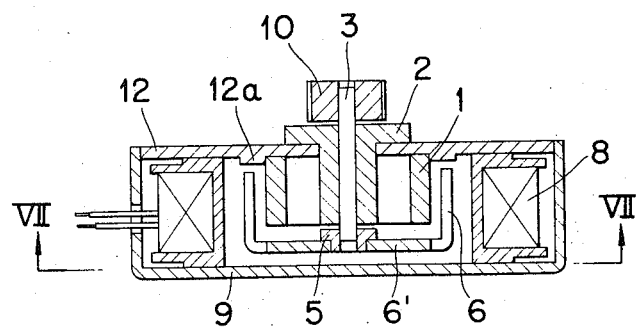
FIG. 6 is a longitudinal cross sectional view of another form of the synchronous motor embodying the present invention.
Figure 7:
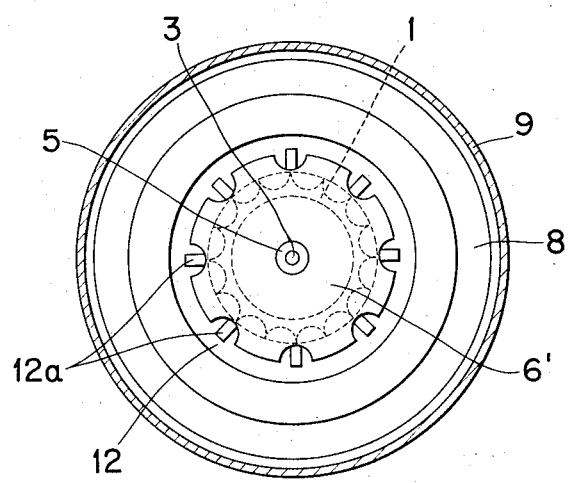
FIG. 7 is a cross sectional view taken along line VII — VII of FIG. 6.

FIGS. 6 and 7 show another form of auxiliary yoke 12 which is similar to the above-mentioned yoke 11. Projections $12_a$ formed on this yoke 12, however, are disposed to face the tip ends of the pole teeth 6 in the axial direction of the rotary shaft 3. The number of said projections $12_a$ is one-half of the number of the poles of the permanent magnet 1 in this embodiment, too.

Figure 8:
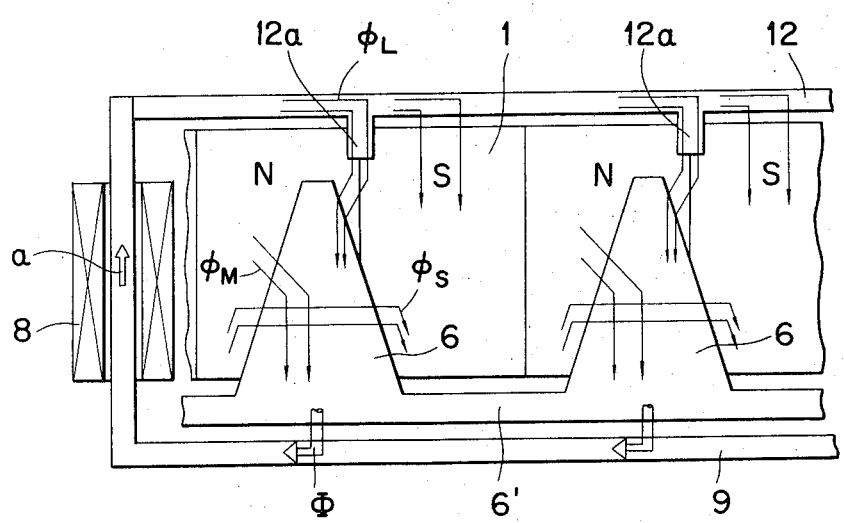
FIG. 8 is a development view of FIG. 6.
Figure 9:
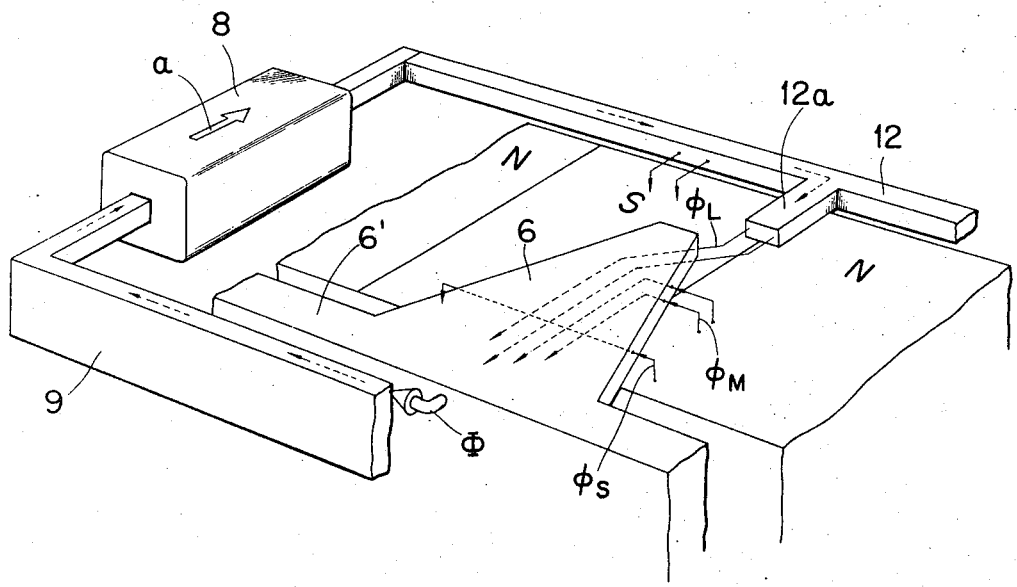
FIG. 9 is a perspective development view of FIG. 6.

The operation of the thus constructed miniature electric synchronous motor is now described referring to FIGS. 6 and 7 together with FIGS. 8 and 9.

When an electric current is supplied to the exciting coil 8 and a magnetic flux emanates in the direction of arrow $a$, there are seen a magnetic flux $\phi$ which comprises an A.C. magnetic flux $\phi_L$ which is generated by the exciting coil 8 and extends from the projection $12_a$ of the auxiliary yoke 12 to the pole tooth 6 facing said projection $12_a$ through an air gap, and further extends from said pole tooth 6 to the main yoke 9 through an air gap and returns to the projection $12_a$ of the auxiliary yoke 12 after interlinking with the annular exciting coil 8 and a magnetic flux $\phi_M$ which emanates from a N-pole of the permanent magnet 1, extending to the pole tooth 6 through an air gap, and further to the main yoke 9 through the air gap and returns to a S-pole of the permanent magnet 1 through the auxiliary yoke 12 after interlinking with the annular exciting coil 8, and a magnetic flux $\phi_s$ which extends from the N-pole of the permanent magnet 1 to the pole tooth 6 through an air gap and returns to the S-pole of the permanent magnet 1 without interlinking with the annular exciting coil 8.

Figure 10:
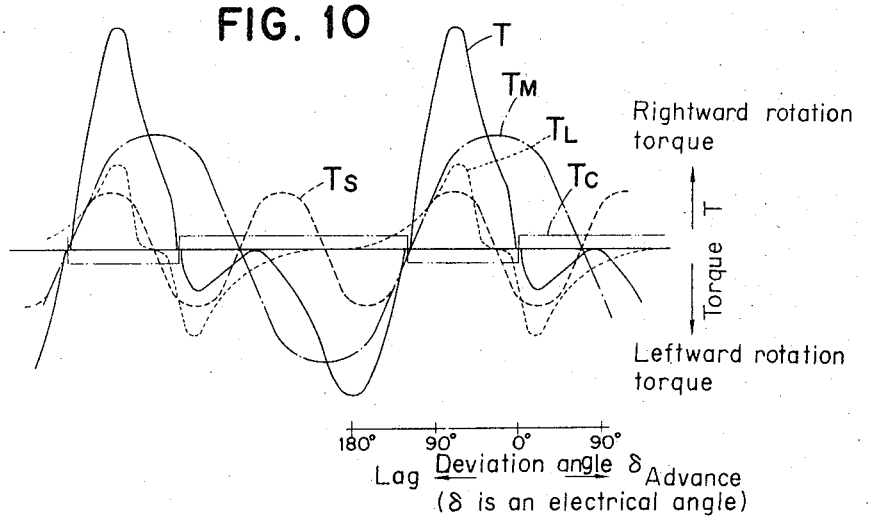
FIG. 10 is an explanatory view showing the torque characteristics.
Figure 10:
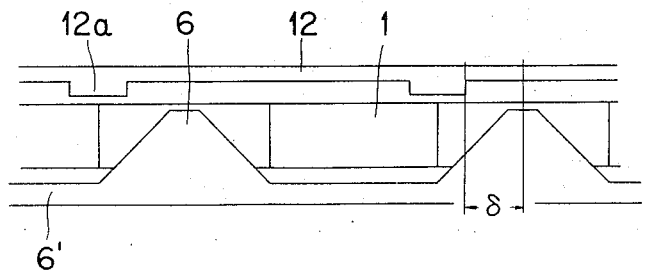
Figure 11:
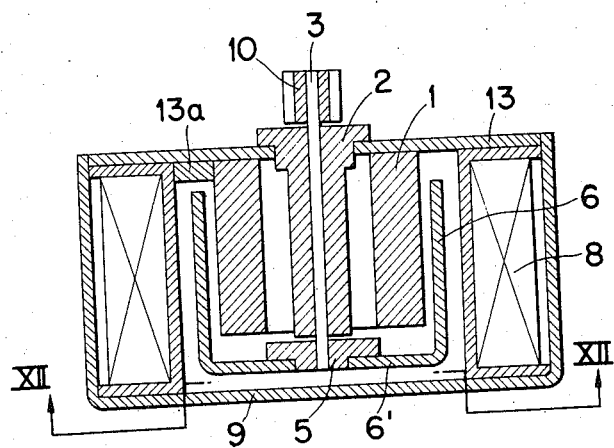
FIG. 11 is a longitudinal cross sectional view of a further form of the synchronous motor embodying the present invention.
Figure 12:
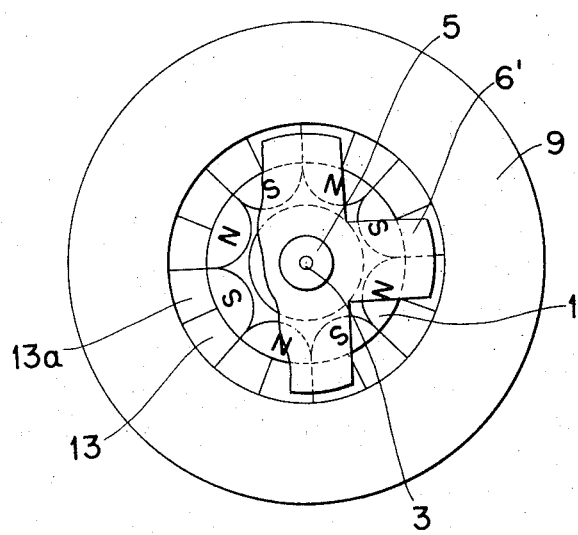
FIG. 12 is a cross sectional view taken along line XII — XII of FIG. 11.
Figure 13:
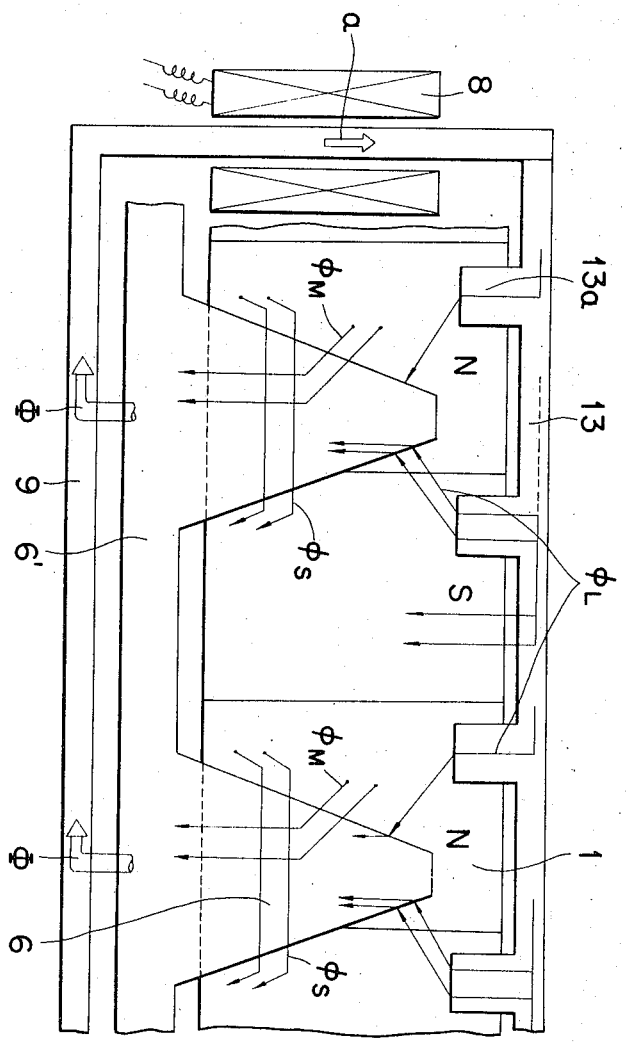
FIG. 13 is a development view of FIG. 11.
Figure 14:
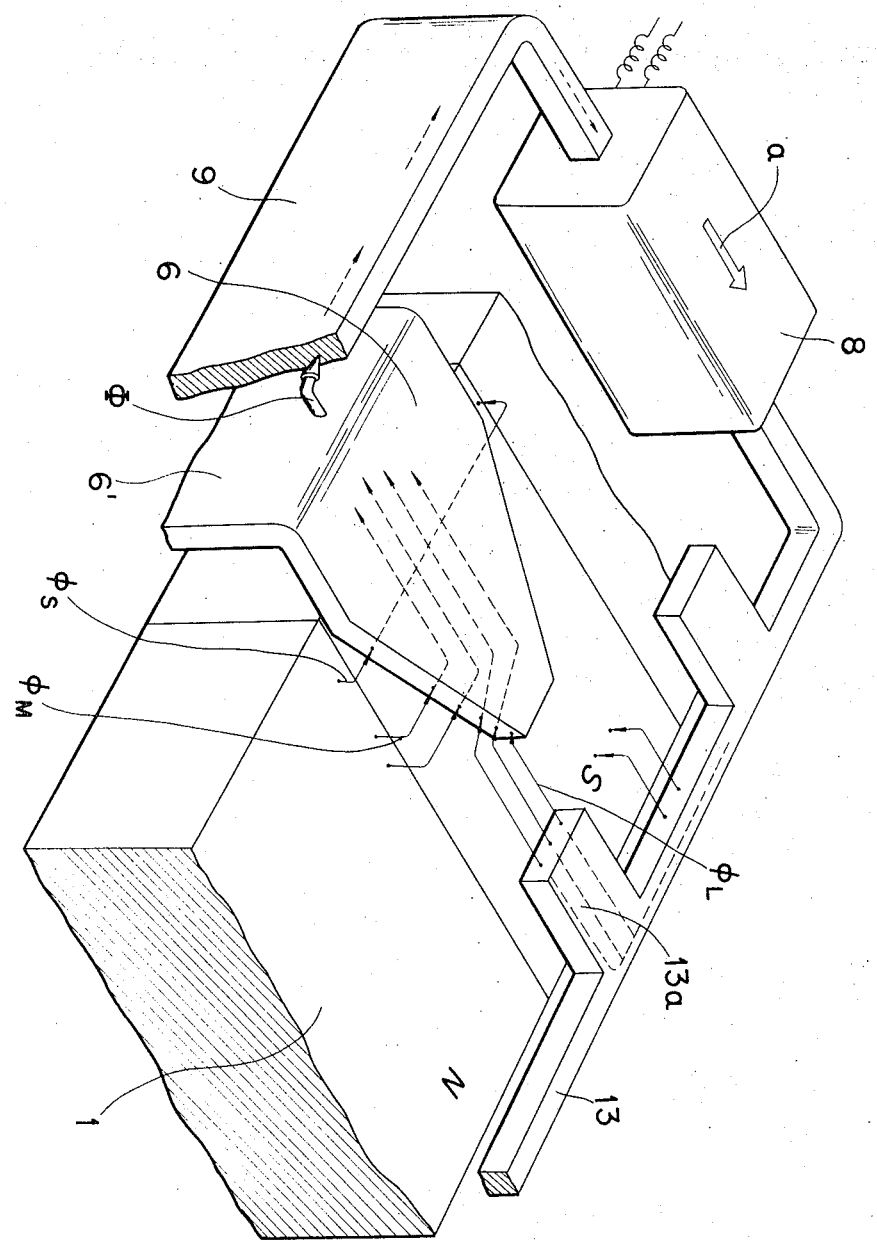
FIG. 14 is a perspective development view of FIG. 11.
Figure 15:
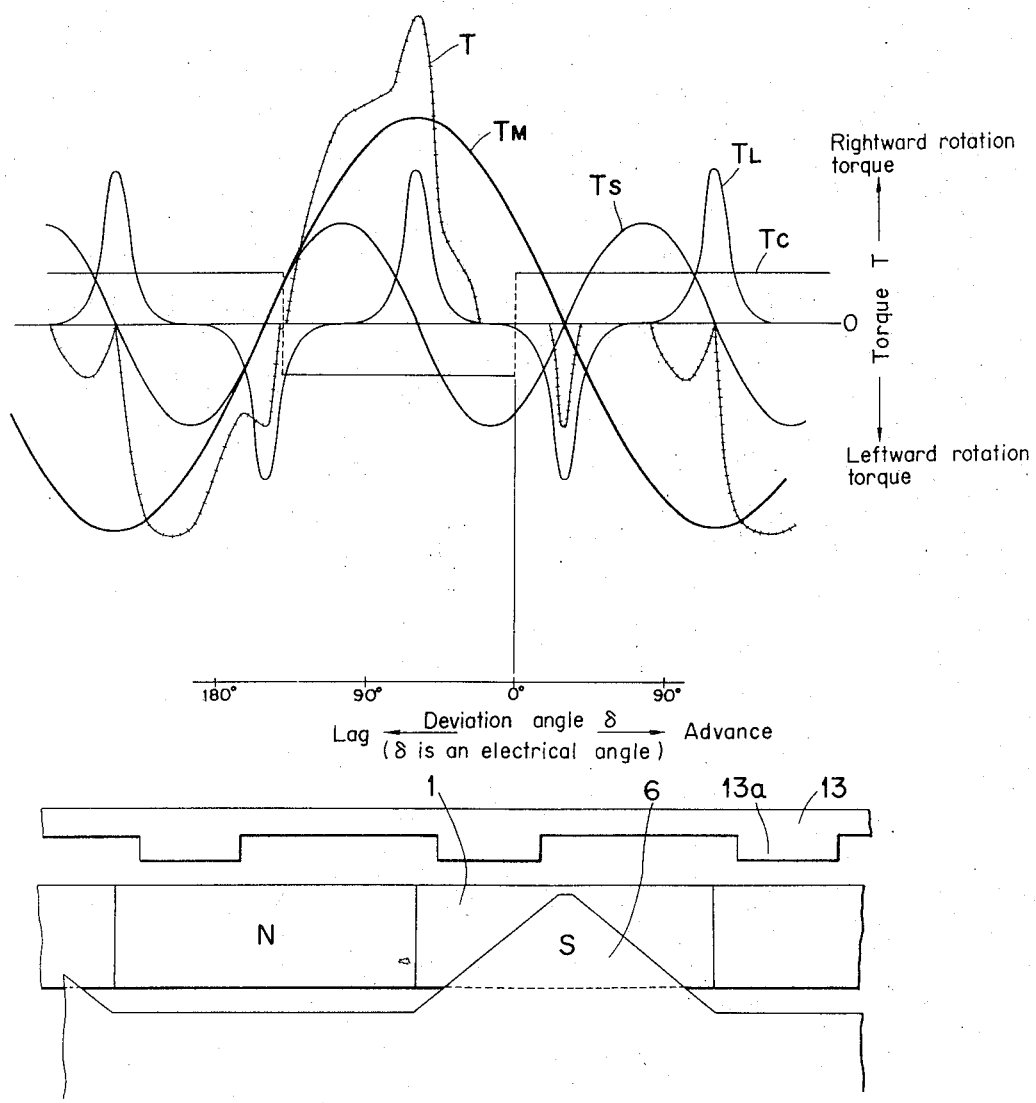
FIG. 15 is an explanatory view showing the torque characteristics.

Assuming that $T_L$ is a rotation torque caused by the A.C. magnetic flux $\phi_L$ between the pole teeth 6 and the projections $12_a$ of the auxiliary yoke 12, that $T_M$ is a rotation torque generated by the magnetic flux $\phi_M$ between the pole teeth 6 and the permanent magnet 1, that $T_S$ is a rotation torque generated by the magnetic flux $\phi_s$ between the pole teeth 6 and the permanent magnet 1 and that $T_C$ is a torque caused due to a journal friction between the rotary shaft 3 and the bearing 2 when the rotor 6' is rotated, the torque $T_C$ acts in the direction opposite to the torque corresponding to the sum of the torques $T_L$, $T_M$ and $T_S$ so that it is reversed in direction when said sum of the torques is reversed in direction. FIG. 10 shows, in accordance with a deviation angle $\delta$, a static characteristic of each of the torques having the above-specified relationship therebetween. Said deviation angle $\delta$ is expressed in term of electric angle and shown in relation with the rotation torque which the pole teeth 6 would obtain when it is positioned thereat.

In case no projections $12_a$ are provided on the auxiliary yoke 12, the torque $T_L$ as shown in FIG. 10 does not appear and accordingly there are no rotation torques $T_M$ and $T_S$ in the vicinity of the central portion of the pole of the permanent magnet 1. On the other hand, there exists a friction torque $T_C$ which acts in the direction opposite to the rotation direction. Accordingly, when the pole teeth 6 rest in the vicinity of the central portions of the respective poles of said permanent magnet 1, the rotor 6' does not start even upon energization of the annular exciting coil 8.

In the present invention, however, the auxiliary yoke 12 is provided with the projections $12_a$ so that the torque $T_L$ is caused between said projections $12_a$ and the pole teeth 6. In FIG. 10, the synthetic torque corresponding to the sum of the torques $T_L$, $T_M$ and $T_S$ and the friction torque $T_C$ is depicted by character T.

Though the synthetic torque T falls to 0 at various deviation angles $\delta$ in FIG. 10, which shows the static characteristic of the torques, the torque $T_L$ varies, when an A.C. current is supplied to the annular exciting coil 8, in accordance with the frequency thereof and the pole teeth 6 obtain at any position rotation torque sufficient to overcome the friction torque $T_C$ to effect self-starting.

Once the pole teeth 6 of the rotor start, turning effort is given by the torques $T_M$ and $T_S$, and additionaly by the torque $T_L$ when the pole tooth is drawn near to the projection $12_a$.

In the embodiment of the present invention as shown in FIGS. 4 and 5, the operation is quite identical with that of the before-mentioned embodiment except a minor difference in the characteristic curve of the torque caused by the A.C. magnetic flux.

In another aspect of the present invention, there is provided a miniature electric synchronous motor comprising a permanent magnet stator magnetized radially to provide north and south poles alternating therearound at equal angular spacings; a rotary shaft disposed coaxially with said permanent magnet stator; a rotor fixed to said rotary shaft and having pole teeth of soft magnetic material extending in the axial direction of said rotary shaft and in the concentric relation with said permanent magnet stator through a gap therebetween, the number of said poles of the permanent magnet stator being an even multiple of the number of said pole teeth; an annular exciting coil concentric with said permanent magnet stator and said rotor and radially spaced from said rotor through a gap; an auxiliary yoke provided with projections of at least $$\frac{\text{number of poles of permanent magnet}}{\text{number of pole teeth}}$$

at positions corresponding to the intermediate positions between the boundary lines of the poles and the center lines of the poles of the permanent magnet at angular spacings of $n \times$ pole-pitch wherein $n$ is an integer, with half of said projections being disposed on the N-pole of the permanent magnet and another half of them being arranged on the S-pole thereof; and a main yoke which forms a magnetic circuit interlinking with said annular exciting coil in cooperation with said pole teeth and said auxiliary yoke.

Illustrative explanation thereof will be made in FIGS. 11 through 15 wherein the number of the projections are as many as that of the poles of the permanent magnet and said projections are disposed angular spacings equal to the pitch of the pole of the permanent magnet.

In FIGS. 11 through 15, projection $13_a$ similar to those of FIGS. 6 and 7 are provided on an auxiliary yoke 13 which is also identical with the auxiliary yoke 12 of FIGS. 6 and 7 at positions intermediate between the respective boundaries of the poles of the permanent magnet 1 and the respective center lines of the poles thereof so as to face the tip ends of the pole teeth 6 in the axial direction of the rotary shaft. In FIGS. 11 to 15, the projections $13_a$ as many as the number of the poles of the permanent magnet 1 are disposed at equal angular spacings, namely angular pole pitch of the permanent magnet 1 on the auxiliary yoke 13, as mentioned above.

The projections $13_a$ may be formed, as in FIGS. 4 and 5, to face the radial peripheries of the end portions of the pole teeth 6 extending in the axial direction of the rotary shaft to attain the object of the present invention with the operation similar to the foregoing embodiments.

What is claimed is:

1. A miniature electric synchronous motor comprising a permanent magnet stator magnetized radially to provide north and south poles alternating therearound at equal angular spacings; a rotary shaft disposed coaxially with said permanent magnet stator; a rotor fixed to said rotary shaft and having pole teeth of soft magnetic material extending in the axial direction of said rotary shaft and in the concentric relation with said permanent magnet stator through a gap therebetween; the number of said poles of the permanent magnet stator being an even multiple of the number of said pole teeth; an annular exciting coil concentric with said permanent magnet stator and said rotor and radially spaced from said rotor through a further gap; an auxiliary yoke provided with at least one projection of angularly limited extent, each said projection being located to face the pole teeth at a position circumferentially deviated from the center line of the adjacent pole of the permanent magnet; and a main yoke which forms a magnetic circuit interlinking with said annular exciting coil in cooperation with said pole teeth and said auxiliary yoke.

2. A miniature electric synchronous motor as claimed in claim 1, wherein the number of said projections is at least $$\frac{1}{2} \times \frac{\text{number of poles of permanent magnet}}{\text{number of pole teeth}}$$

and said projections are at positions corresponding to the boundary lines between the adjacent two poles of the permanent magnet at angular spacings of $2n \times$ pole-pitch wherein $n$ is an integer.

3. A miniature electric synchronous motor as claimed in claim 1, wherein the number of said projections is at least $$\frac{\text{number of poles of permanent magnet}}{\text{number of pole teeth}}$$

and said projections are at positions corresponding to the intermediate positions between the boundary lines of the poles and the center lines of the poles of the permanent magnet at angular spacings of $n \times$ pole-pitch wherein $n$ is an integer, with half of said projections being disposed at the N-poles of the permanent magnet and another half of them being arranged on the S-pole thereof.

4. A miniature electric synchronous motor as claimed in claim 1, wherein said projections are formed to face said pole teeth in the radial direction of said pole teeth.

5. A miniature electric synchronous motor as claimed in claim 1, wherein said projections are formed to face said pole teeth in the axial direction of the rotary shaft.

6. A miniature electric synchronous motor as claimed in claim 2, wherein said projections are arranged concentrically with the permanent magnet so as to face the diametrical peripheries of the supported end portions of said pole teeth, said projections extending in the axial direction of said rotary shaft, said projections being disposed at equal angular intervals each corresponding to two pitches of the poles of said permanent magnet so that the number of projections is one half the number of poles of said permanent magnet.

7. A miniature electric synchronous motor as claimed in claim 2, wherein said projections on said auxiliary yoke extend axially therefrom and face the tip ends of said axially extending pole teeth, said projections being arranged concentrically with said permanent magnet at equal angular intervals each corresponding to two pitches of the poles of said permanent magnet so that the number of projections is one half the number of poles of said permanent magnet.

8. A miniature electric synchronous motor as claimed in claim 3, wherein said projections on said auxiliary yoke extend axially therefrom and face the tip ends of said pole teeth in the axial direction of said rotary shaft, the number of projections being the same as the number of poles of said permanent magnet, said projections being disposed at equal angular spacings corresponding to the angular pole pitch of said permanent magnet.

* * * * *